US009236620B2

(12) United States Patent
Li et al.

(10) Patent No.: US 9,236,620 B2
(45) Date of Patent: Jan. 12, 2016

(54) COMPOSITE SEPARATORS AND REDOX FLOW BATTERIES BASED ON POROUS SEPARATORS

(71) Applicant: Battelle Memorial Institute, Richland, WA (US)

(72) Inventors: Bin Li, Richland, WA (US); Xiaoliang Wei, Richland, WA (US); Qingtao Luo, Richland, WA (US); Zimin Nie, Richland, WA (US); Wei Wang, Kennewick, WA (US); Vincent L. Sprenkle, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 169 days.

(21) Appl. No.: 13/668,604

(22) Filed: Nov. 5, 2012

(65) Prior Publication Data

US 2014/0127542 A1 May 8, 2014

(51) Int. Cl.
*H01M 8/02* (2006.01)
*H01M 8/18* (2006.01)
(Continued)

(52) U.S. Cl.
CPC .......... *H01M 8/0243* (2013.01); *H01M 8/0291* (2013.01); *H01M 8/04186* (2013.01); *H01M 8/188* (2013.01); *H01M 8/20* (2013.01); *Y02E 60/528* (2013.01)

(58) Field of Classification Search
CPC ..... H01M 8/02; H01M 8/0202; H01M 8/023; H01M 8/0236; H01M 8/0239; H01M 8/18; H01M 8/188; H01M 8/20
USPC .......................................................... 429/74
See application file for complete search history.

(56) References Cited

U.S. PATENT DOCUMENTS 4,153,661 A 5/1979 Ree et al.
4,308,325 A 12/1981 Verzwyvelt
(Continued)

FOREIGN PATENT DOCUMENTS

CN 102456904 A 10/2010
CN 102569840 A 12/2010
(Continued)

OTHER PUBLICATIONS

International Search Report/Written Opinion for International Application No. PCT/US2013/040853, International Filing Date May 14, 2013, Date of Mailing Aug. 12, 2013.
(Continued)

*Primary Examiner* — Stewart Fraser
(74) *Attorney, Agent, or Firm* — Klarquist Sparkman, LLP (57) ABSTRACT

Composite separators having a porous structure and including acid-stable, hydrophilic, inorganic particles enmeshed in a substantially fully fluorinated polyolefin matrix can be utilized in a number of applications. The inorganic particles can provide hydrophilic characteristics. The pores of the separator result in good selectivity and electrical conductivity. The fluorinated polymeric backbone can result in high chemical stability. Accordingly, one application of the composite separators is in redox flow batteries as low cost membranes. In such applications, the composite separator can also enable additional property-enhancing features compared to ion-exchange membranes. For example, simple capacity control can be achieved through hydraulic pressure by balancing the volumes of electrolyte on each side of the separator. While a porous separator can also allow for volume and pressure regulation, in RFBs that utilize corrosive and/or oxidizing compounds, the composite separators described herein are preferable for their robustness in the presence of such compounds.

11 Claims, 12 Drawing Sheets

(51) Int. Cl.
  *H01M 8/20* (2006.01)
  *H01M 8/04* (2006.01)

(56) References Cited

U.S. PATENT DOCUMENTS

| | | | |
|---|---|---|---|
| 4,460,642 | A | 7/1984 | Errede et al. |
| 5,009,971 | A | 4/1991 | Johnson et al. |
| 5,071,610 | A | 12/1991 | Hagen et al. |
| 7,517,608 | B2 | 4/2009 | Brereton et al. |
| 2003/0219587 | A1 | 11/2003 | Pekala et al. |
| 2010/0216006 | A1* | 8/2010 | Rennebeck ............... 429/105 |
| 2012/0003546 | A1 | 1/2012 | Han et al. |
| 2012/0034509 | A1 | 2/2012 | Bae et al. |
| 2013/0252137 | A1* | 9/2013 | Zhang et al. ............... 429/516 |

FOREIGN PATENT DOCUMENTS

| | | | |
|---|---|---|---|
| WO | WO 2012075810 | * | 6/2012 |
| WO | 2012094672 A2 | | 7/2012 |

OTHER PUBLICATIONS

Prifti, Helen, et al., "Membranes for Redox Flow Battery Applications," Membranes, Jun. 19, 2012, pp. 275-306, vol. 2, MDPI, Basel, Switzerland.

* cited by examiner

COMPOSITE SEPARATORS AND REDOX FLOW BATTERIES BASED ON POROUS SEPARATORS

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Redox flow batteries (RFB) have attracted significant attention as an important energy storage system. Advantages of RFB systems include separation of energy capacity and power output, long service life, relative safety, and ease of manufacturing. As a result, RFB systems compose a leading consideration for applications such as large-scale energy storage and integral components in electrical power infrastructure.

However, both technical and economic barriers have limited commercial uptake of RFBs. For example, long-term operation stability and high cost have limited the technology from broader market penetration. In many instances, these barriers are associated with the membrane that provides physical separation between the positive and negative electrolytes to prevent their cross-mixing while allowing passage of charge carriers to complete the circuit.

In many mature RFB systems, perfluorinated ion exchange materials are used as the membrane. However, these materials are not preferable at least because they are extremely expensive and can account for 40% of the total cost of a RFB stack, which comprises a plurality of RFB cells, or repeat units. Furthermore, in all-vanadium RFBs, for example, the use of these materials (e.g., NAFION®) can result in capacity decay due to the different transfer rates of the four vanadium ions and the asymmetrical valence state of vanadium ions caused by subsequent self-discharge reactions between the transferred and native vanadium ions.

One alternative to a perfluorinated ion exchange membrane is a microporous separator. However, it is unlikely that typical microporous separators can withstand the harsh chemical environment of certain RFBs. Accordingly, a need for improved RFB separators exists to reduce cost, improve performance, and/or enable additional property-enhancing developments.

SUMMARY

This document includes descriptions of composite separators that satisfy at least some of the desirable criteria for good RFB battery performance, including durability and/or low cost, while also offering additional operational latitude. The composite separators described herein can be an alternative to the traditional, expensive perfluorinated ion exchange membranes because the composite separators require lower overall capital and cycle costs while offering sufficient performance. Furthermore, they can enable additional performance-improving features such as regulation of the volume of the electrolytes on each side of the separator.

One embodiment described herein includes a composite separator having a porous structure and comprising aggregated inorganic particles comprising an acid-stable, hydrophilic, inorganic material. The matrix comprises a substantially fully fluorinated polyolefin, wherein the substantially fully fluorinated polyolefin is at least 25% of the polyolefin and inorganic material combined weight.

The acid against which the inorganic particle is stable includes those acids encountered during assembly and/or operation of an RFB. For example, the acid-stable, hydrophilic inorganic particle can comprise materials that include, but are not limited to, silicon, zirconium, niobium, titanium, boron, and combinations thereof. Materials can also include oxides of silicon, zirconium, niobium, titanium, boron, and combinations thereof. Additionally, materials can include nitrides of silicon, zirconium, niobium, titanium, boron, and combinations thereof. In a preferred embodiment, the acid-stable, hydrophilic inorganic material comprises silicon oxide.

As used herein, substantially fully fluorinated polyolefins refer to polyolefins in which, ostensibly, all of the hydrogen-carbon bonds are replaced with fluorine-carbon bonds. Examples can include, but are not limited to, polytetrafluoroethylene (PTFE), hexafluoropropylene (HFP), fluorinated ethylene propylene (FEP), and combinations thereof. Examples of combinations of fully fluorinated polyolefins can take the form of co-polymers and/or polymer blends.

In one instance, the agglomerated inorganic particles have a median diameter less than or equal to 500 nm. In other instances, the agglomerated particles can comprise primary particles having a median diameter less than or equal to 100 nm.

The porous structure of the separator can have pores with a median diameter that is greater then or equal to 5 nm and/or that is less than or equal to 250 nm.

The substantially fully fluorinated polyolefin can be from 30% to 95% of the combined weight of the polyolefin and the inorganic material. In preferred embodiments, the polyolefin is from 50% to 90% of the combined weight of the polyolefin and the inorganic material.

Another embodiment described herein includes a RFB having a first volume of a positive electrolyte and a second volume of a negative electrolyte. The RFB is characterized by a porous separator between the first and second volumes and by a pressure controller configured to regulate pressures applied to the positive and negative electrolytes on respective sides of the separator during battery operation. Pressure regulation allows for adjustments in the relative volumes of the positive and negative electrolyte by transferring positive or negative electrolyte across the separator to maintain a target ratio between the first and second volumes.

In one example, the RFB can further comprise a first container containing a portion of the first volume and a second container containing a portion of the second volume, wherein head pressure in the first and second containers are different. In another example, the RFB can further comprise a first container containing a portion of the first volume and a second container containing a portion of the second volume, wherein the pressure controller comprises one or more pumps affecting head pressure in the first container, the second container, or both.

As used herein, the term porous separator can encompass composite separators as described by embodiments of the present invention. However, it can also encompass traditional membranes such as polyolefin porous separators, graft polymer separators, and others. Particular examples can include, but are not limited to, polymethylmethacrylate, polyvinylidifluoride, polyethylene, polypropylene, and their blends. In some instances, the porous separator comprises pores having a median diameter greater than or equal to 5 nm. Preferably, the porous separator comprises a composite separator having aggregated inorganic particles enmeshed in a matrix. The aggregated inorganic particles comprise an acid-stable, hydrophilic, inorganic material and the matrix comprises a substantially fully fluorinated polyolefin. The substantially fully fluorinated polyolefin is from 30% to 95% of the polyolefin and inorganic material combined weight.

A further embodiment described herein includes an all vanadium RFB having a composite separator between positive and negative electrolytes each comprising a vanadium redox couple. The RFB is characterized in that the composite separator has a porous structure and comprises aggregated inorganic particles enmeshed in a matrix. The aggregated inorganic particles comprise an acid-stable, hydrophilic, inorganic material and the matrix comprises a substantially fully fluorinated polyolefin, wherein the substantially fully fluorinated polyolefin is at least 25% of the polyolefin and inorganic material combined weight. Preferably, the acid-stable, hydrophilic inorganic material resists oxidation by $VO_2^+$ ions.

Examples of substantially fully fluorinated polyolefins can include, but are not limited to, PTFE, HFP, FEP, and combinations thereof. The polyolefin can be from 30% to 95% of the combined weight of the polyolefin and the inorganic particles. Preferably, the polyolefin is from 50% to 90% of the combined weight.

The acid-stable, hydrophilic inorganic material can comprise a material including, but not limited to, silicon, zirconium, niobium, titanium, boron, and combinations thereof. Suitable materials can also comprise oxides of silicon, zirconium, niobium, titanium, boron, and combinations thereof. Additionally, materials can comprise nitrides of silicon, zirconium, niobium, titanium, boron, and combinations thereof. In a preferred embodiment, the acid-stable, hydrophilic inorganic material comprises silicon oxide.

In some instances, the all-vanadium RFB can further comprise a pressure controller configured to regulate pressures applied to the positive and negative electrolytes on respective sides of the separator during battery operation, thereby adjusting the volume of the positive and negative electrolyte by flowing positive or negative electrolyte across the composite separator.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

At least a portion of this document describes low-cost and highly durable composite separators having a porous structure and comprising acid-stable, hydrophilic, inorganic particles enmeshed in a substantially fully fluorinated polyolefin matrix. The inorganic particles can provide hydrophilic characteristics. The pores of the separator result in good selectivity and electrical conductivity. The fluorinated polymeric backbone can result in superior chemical stability. Accordingly, one application of the composite separators is in RFBs as a membrane. In such applications, the composite separator can also enable additional property-enhancing features compared to ion-exchange membranes. For example, simple capacity control can be achieved through hydraulic pressure by balancing the volumes of electrolyte on each side of the separator. While a porous separator can also allow for volume and pressure regulation, in RFBs that utilize corrosive and/or oxidizing compounds, the composite separators described herein are preferable for their robustness in the presence of such compounds.

The following example, which is not limiting, describes the making of one embodiment of a composite separator and its usage and performance in an RFB cell. The composite separator comprises nanosized silica particles enmeshed in a PTFE fibril matrix. Both the silica particles and the —$CF_2$— backbone of the PTFE are chemically inert to the strongly acidic and oxidative environment in a VRB. The silica particles can provide the composite separator with high hydrophilicity because of their excellent wetting ability, and contribute to the nanoporous structure because of their submicron size. The PTFE fibril network helps make the separator both flexible and mechanically strong for reliable flow battery operation. The cost of the separator is estimated to be relatively much lower than ion exchange membranes, such as NAFION®, because of the inexpensive raw materials and simple preparation protocol. The PTFE/silica composite separator demonstrated excellent VRB cycling performance while maintaining excellent chemical stability.

Generally, composite separators are prepared by shear-blending an aqueous dispersion of the fully fluorinated polyolefin and the acid-stable, hydrophilic inorganic particles at elevated temperature, followed by calendering into flat sheet form. When subjected to the shear forces, the polyolefin particles are fibrillated to form a matrix, which creates robust accommodations for the inorganic particles. In the instant example, the PTFE/silica composite separator was prepared by shear blending amorphous precipitated silica particles (Hi-Sil SBG®, 9.1 grams, PPG Industries, Pittsburgh, Pa.) with an aqueous PTFE dispersion (30 wt %, diluted from TE3859, 80 mL, Ion Power, New Castle, Del.) in a measuring mixer and extruder system for 5-30 minutes at 90° C. and 50-150 rpm until formation of a dough-like lump. The admixture was then calendered into a flat sheet separator of desirable thickness on a manual slip roll. The separator, which contained 77 wt % PTFE to 23 wt % silica was then assembled into VRB flow cells.

Figure 1A:
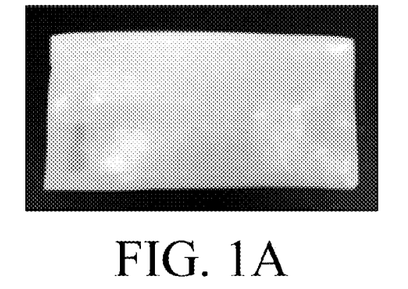
FIG. 1A is an image of a composite separator according to embodiments of the present invention.
Figure 1B:
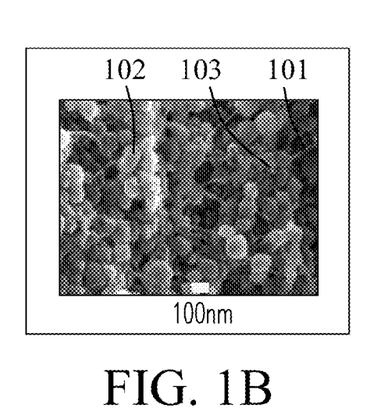
FIG. 1B is a cross-sectional field-emission scanning electron microscope micrograph of a composite separator according to embodiments of the present invention.
Figure 1C:
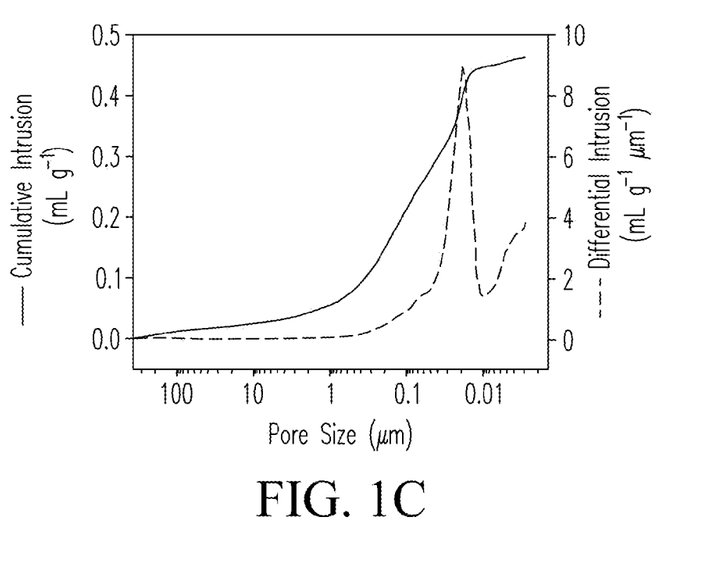
FIG. 1C is a graph showing Mercury intrusion pore size distribution of a composite separator according to embodiments of the present invention.

Referring to FIG. 1a, the PTFE/silica separator had a water uptake of 48% and was considered highly hydrophilic. The microstructures of the separator were characterized by field emission scanning electron microscopy (FESEM) and a typical cross-sectional FESEM micrograph is shown in FIG. 1b. A polymer network of reticulated PTFE fibrils 101 enmeshed the silica particles (~250 nm) 102 that were in an agglomerated form comprising of smaller primary particles (~40 nm). The major portion of the pores are considered to be the void spaces 103 between the primary particles. FIG. 1c is a graph showing the pore size distribution of the PTFE/silica separator that was air-dried at 50° C. by mercury intrusion porosimetry analysis. The average pore size was 38 nm and the majority of the pore size was distributed within a narrow range of 10-200 nm with a peak value at 20 nm. The porosity of the separator was 48% and the overall surface area of the pores was 48.06 $m^2 \cdot g^{-1}$. Table 1 summarizes the typical physical properties of PTFE/silica composite separators so prepared.

TABLE 1

Physical properties of the PTFE/silica separator.

| Membrane | Thickness (μm) | Bulk Density (g · $mL^{-1}$) | Average Pore Size (nm) | Porosity | Pore Area ($m^2 \cdot g^{-1}$) | Water Uptake (wt %) |
|---|---|---|---|---|---|---|
| PTFE/silica | 600 | 1.047 | 38 | 48% | 48.06 | 48 |

Figure 2:
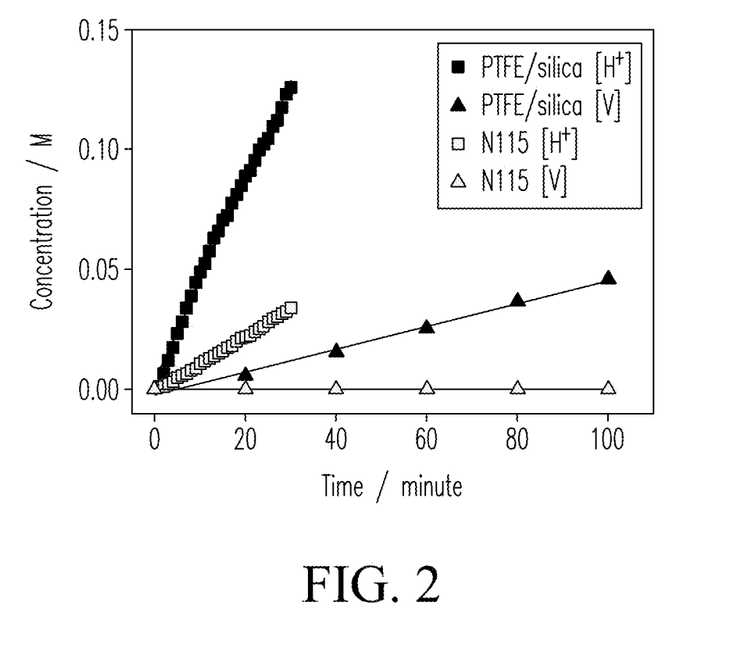
FIG. 2 is a plot comparing proton and vanadium diffusion across a composite separator and an ion exchange membrane.

The proton-over-vanadium selectivity was determined by measuring the proton and vanadium concentrations in the recipient side (deionized water) of a diffusion cell against an electrolyte of 2.5M $VOSO_4$-5M HCl across the PTFE/silica separator. A Nafion membrane (N115) was tested as a reference. Due to the structural difference, the PTFE/silica separator and Nafion membranes have different ion transport mechanism. Nafion membranes possess ion transport channels of ~2.4 nm diameter according to the water channel model. The PTFE/silica separator has much larger pore structures that serve as the ion transport channels. Relative to N115, FIG. 2 shows faster diffusions of both protons and vanadium across the composite separator because these pores not only allow passage of protons but also increase transport of the vanadium species. However, it can also be seen that to the PTFE/silica separator still demonstrated a remarkably high proton-over-vanadium selectivity. Such selectivity is believed to originate from the higher diffusion rate of protons in the pores than that of the vanadium species due to their significantly different sizes.

Figure 3A:
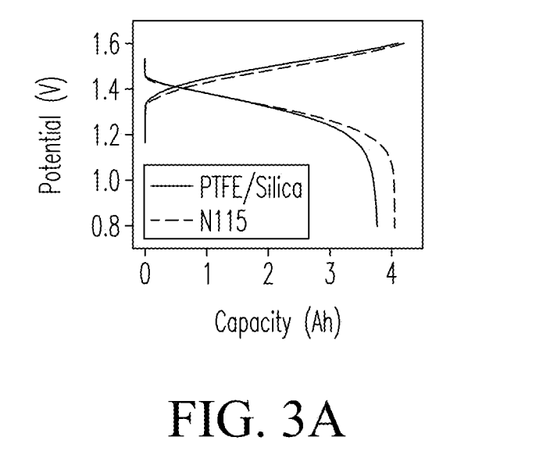
FIGS. 3A-3D are graphs summarizing the electrochemical performance of a composite separator in a VRB cell.

The electrochemical performance of the PTFE/silica separator in a VRB flow cell was examined using a similar electrolyte comprising 2.5M $VOSO_4$-5M HCl. The initial cycling test was carried out at room temperature using a current density of 50 mA·$cm^{-2}$ with the voltage cutoff at 0.8-1.6V. The VRB performance of N115 was measured in parallel as a reference. The area specific resistivity (ASR) of the VRB flow cells were measured by electrochemical impedance spectroscopy (EIS) prior to the cycling test. The flow cell ASR includes contributions from the membrane resistance, the electrolyte resistance, and the contact resistance. While the latter two remain constant regardless of the membranes, the flow cell ASR well reflects the resistivity of the membranes. The flow cell using the PTFE/silica separator showed a flow cell ASR of 1.26 Ω·$cm^{-2}$ and N115 of 1.01 Ω·$cm^{-2}$ in the above electrolyte, implying that the PTFE/silica separator had a higher resistivity than N115. The charge—discharge voltage profiles in FIG. 3a show the PTFE/silica separator exhibited a higher over-potential than N115. The voltage profile also indicated a higher self-discharge of the PTFE/silica separator as a consequence of its larger-size ion transport channels affording higher vanadium diffusion.

Figure 3B:
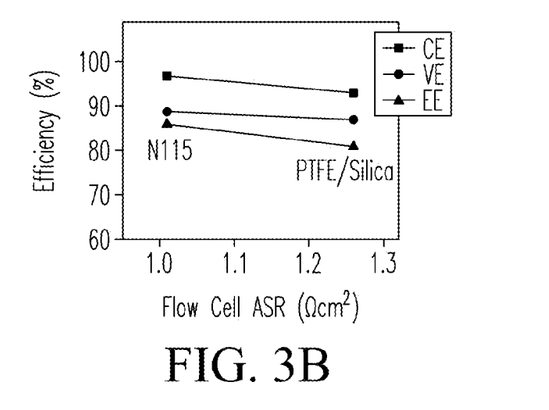
Figure 3C:
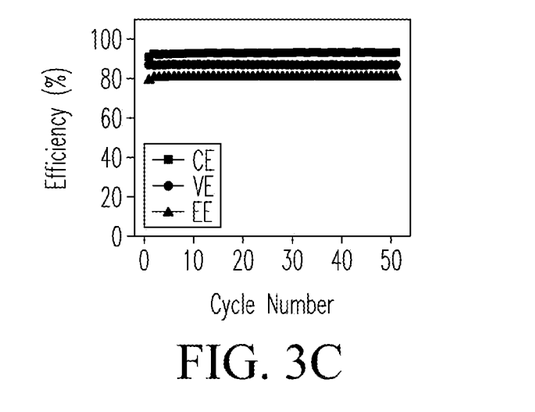

Referring to FIG. 3b, the PTFE/silica separator produced a columbic efficiency (CE) of 93%, a voltage efficiency (VE) of 87%, and an energy efficiency (EE) of 81% in the VRB mixed acid system under the test conditions. Both CE and VE of the separator were lower than N115 having 97% CE and 89% VE. The lower CE of the separator indicated a higher self-discharge originating from the higher vanadium transport. The lower VE agreed with the higher flow cell ASR of the separator. FIG. 3c displays the stable efficiencies of the PTFE/silica separator for 50 cycles, demonstrating the reliability of this composite separator over extended cycling. The EE of the separator was around five percentage points lower than that of N115 (86%).

Figure 3D:
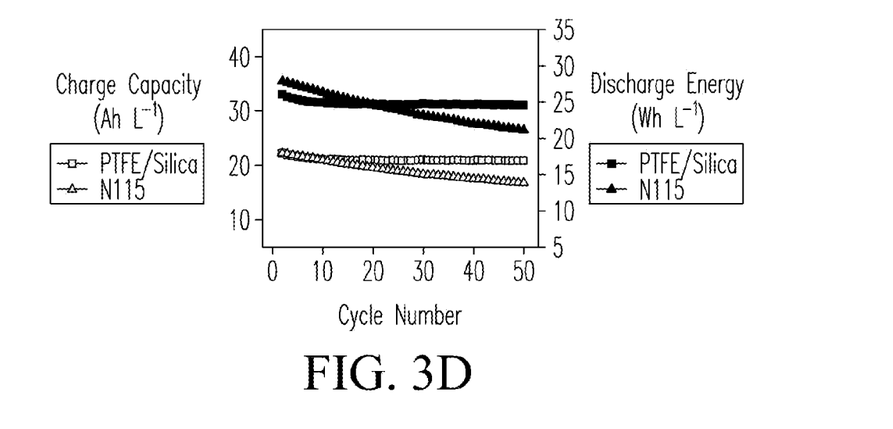

Referring to the plot of charge capacity and discharge energy over cycling in FIG. 3D, the PTFE/silica separator unexpectedly exhibited an excellent capacity and energy retention capability over cycling, while N115 did not. Starting from an initial charge capacity of 22.3 Ah·$L^{-1}$, the VRB flow cell using the separator maintained a stable charge capacity of ~21 Ah·$L^{-1}$ after an obvious decay during the first 10 cycles, while the one using N115 produced a constant capacity decay over 50 cycles at a decay rate of 0.5% per cycle. With the separator, the electrolyte volumes remained almost unchanged during cycling after the 10th cycle. The discharge energy of the separator was lower than N115 during the first 20 cycles because of its lower EE (81% versus 86%). As the cycling proceeded, the discharge energy of N115 decayed constantly while the separator stabilized its discharge energy at ~25 Wh·$L^{-1}$, leading to a higher delivered energy of the separator than N115 in the subsequent cycles.

Capacity decay has proven to be a common issue for VRB systems employing ion exchange membranes. These membranes tend to yield vanadium imbalance in the positive and negative electrolytes due to the different diffusion rates of the four vanadium species. Continuous capacity decay can bring forth the deteriorative risk of electrolyte precipitation over long-term cycling and thus necessitates frequent electrolyte maintenance to reinstate the VRB system. In contrast, the PTFE/silica separator exhibited an unexpected ability to maintain stable capacity over extended cycling that was ascribed to its porous nature. The pores are relatively large transport channels for water and ions thus making it easy to manipulate water and ion transports by adjusting the lateral pressure drop across the composite separator.

With porous separators, including the composite separators described herein, pressure can become the dominant factor to control water and ion transports during RFB cycling and thus the capacity decay could be mitigated either by applying a higher electrolyte flow rate or by adding a small pressure to the recipient electrolyte. The initial pressure drop existing across the porous separator caused the capacity decay during the first 10 cycles. The electrolyte transported from the positive to the negative side gradually built up the pressure at the negative side until a hydraulic pressure balance was reached giving rise to the stable capacity in subsequent cycling. Therefore, the capacity retention capability of the porous separator can enable an RFB system to produce consistent energy delivery with greatly diminished system maintenance, which is a special advantage for redox flow battery application. Use of the porous separator in a VRB, or any RFB, can potentially result in reduced cycle cost and improved overall system efficiency The rate capability and the operational temperature range are two parameters that can be used to evaluate a redox flow battery system. The current density determines the output power density of the given VRB. A higher rate capability is favorable because of improved power density or reduced stack size leading to lower capital costs. VRB usually operates at elevated temperature because the flowing electrolytes can't dissipate all the heat generated by the electrode reactions.

Figure 4A:
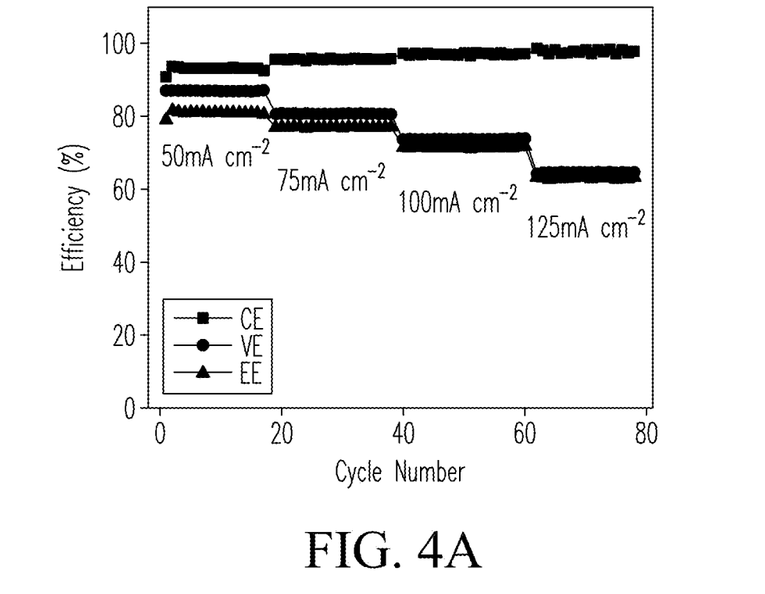
FIGS. 4A and 4B are graphs summarizing cycling efficiencies of VRB cells having composite separators.

FIG. 4a shows the rate capability of the VRB flow cell using the PTFE/silica composite separator over charge—discharge cycling at 20° C. The flow cell efficiencies remained constant at each current density. CE increased with the current density from 93% at 50 mA·cm$^{-2}$ to 98% at 125 mA·cm$^{-2}$ ascribed to shorter charge and discharge durations lessening the vanadium crossover, while VE dropped from 87% at 50 mA·cm$^{-2}$ to 65% at 125 mA·cm$^{-2}$ due to higher cell ohmic overpotential. Because CE changed to a lesser extent than VE, EE decreased from 81% at 50 mA·cm$^{-2}$ to 72% at 100 mA·cm$^{-2}$ to 63% at 125 mA·cm$^{-2}$.

Figure 4B:
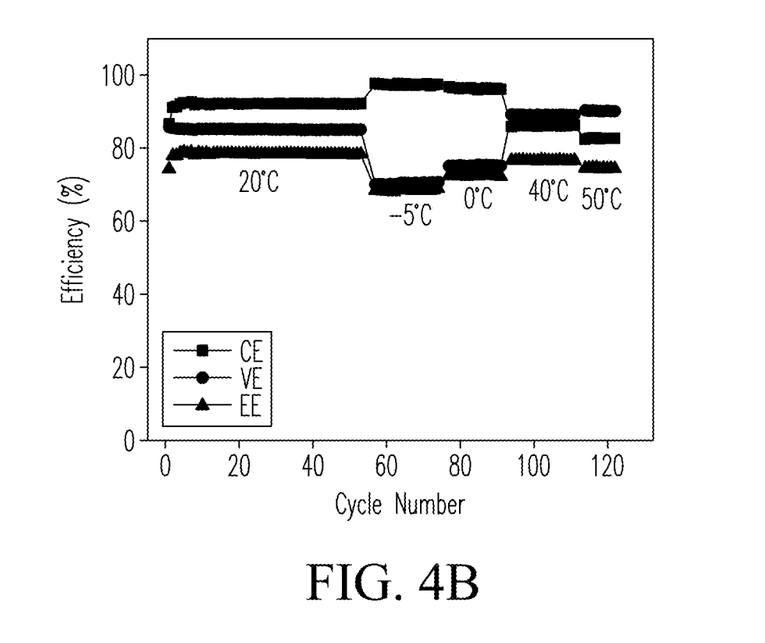

FIG. 4b shows the VRB flow cell cycling efficiencies of the PTFE/silica separator with respect to temperature at a current density of 50 mA·cm$^{-2}$. The composite separator produced stable efficiencies over cycling at each temperature between −5-50° C., the operational temperature range of the mixed-acid VRB system. As the temperature increased, the CE dropped from 97% at −5° C. to 80% at 50° C. because of accelerated crossover transport of the vanadium species. The VE went upward from 73% at −5° C. to 91% at 50° C. because of the increased conductivity of the flow cell and improved electrode kinetics. The VRB system exhibited EE above 68% in the whole temperature range. These results indicate that the PTFE/silica separator demonstrated desirable flow cell performance over the temperature and current density ranges typical for mixed-acid VRB operations.

As described elsewhere herein, porous separators can enable additional performance-enhancing features in RFBs. For example, by controlling the pressure applied to the positive and negative electrolytes on respective sides of the separator, the volume of the positive and negative electrolyte can be adjusted by flowing positive or negative electrolyte across the separator. Convection appears to influence the capacity fading. According to embodiments of the present invention, the capacity can be stabilized and the net transfer of solutions can be prevented by slightly tailoring the pressure differential at both sides of separators.

In contrast to the RFBs with porous separators, convection can be neglected in flow cells using ion exchange membranes (IEM), such as Nafion. Even applying high pressure differentials on both sides of an IEM will not result in convective flow across the IEM. Therefore, pressure will not typically influence the capacity decay and the net transfer of solutions over cycling for RFBs using IEMs.

Figure 5:
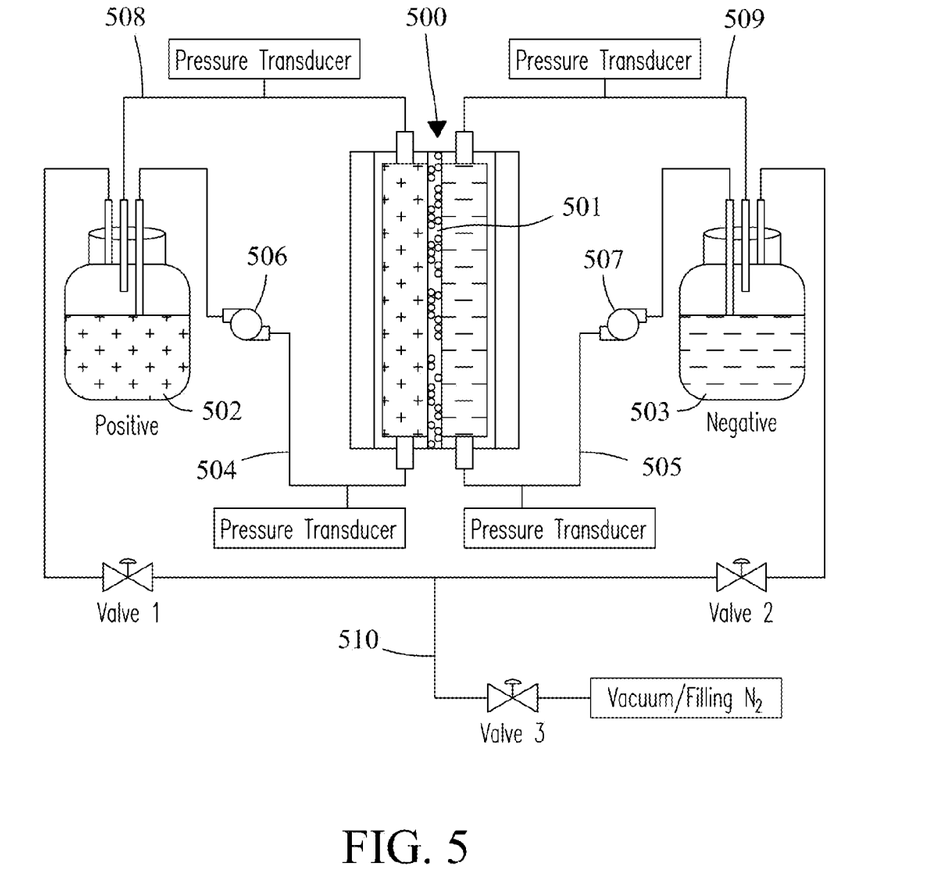
FIG. 5 is a schematic diagram of a RFB cell utilizing pressure and/or volume regulation according to one embodiment of the present invention.

Referring to FIG. 5, a schematic depicts an embodiment of a RFB that regulates capacity by tailoring pressures and/or volumes on each side of a porous separator 501. A single flow cell 500 was connected to two measuring cylinders, 502 and 503, through peristaltic pumps, 506 and 507, and tubing. The inlet (504 and 505) and outlet (508 and 509) of each half cell were both connected to a solid pressure transducer, which was directly connected to a battery tester to read out the liquid pressures at inlet and outlet side with time. The liquid pressure can be regulated, for example, by removing or filling an inert gas into the measuring cylinders using a line connected to a gas source of vacuum 510.

In one instance, porous graphite felt with apparent areas of 10 cm$^2$ served as the electrode in each half cell. The electrodes were oxidized in air for 400° C. for 6 hours prior to the test so as to improve the electrochemical activity and hydrophilicity. A commercially available cation-exchange membranes (Nafion 115®) and a micro-porous separator (i.e., polyethylene) were used as the membranes, respectively, in control cells. The original electrolytes were prepared by dissolving 2 M VOSO$_4$ in concentrated 5M HCl (37%) at room temperature. First of all, 50 mL and 100 mL original electrolytes were poured into the measuring cylinders at negative side and positive side, respectively. In case of oxidation, the cylinder at both sides were purged by pure N$_2$ and sealed. After charging the original V$^{4+}$ solutions to an upper voltage limit of 1.70 V using a battery tester with a state of charge (SOC) greater than 90%, the resultant 50 mL solutions containing V$^{5+}$ ions at positive side was taken out from corresponding cylinder. The flow cell was then cycled in the voltage window between 1.60 V and 0.80 V at a constant charge/discharge current density of 50 mA/cm$^2$. The flow rates at both sides were fixed to be 20 mL/min.

For a viscous liquid flowing through a porous media, such as the porous electrodes, the pressure drop occurs over a given distance. The relationship can be described by Darcy's law below:

$$Q = \frac{-kA(P_{out} - P_{in})}{\mu L} \quad (1)$$

Where Q is the flow rate (units of volume per time, e.g., mL/min); k is the permeability of the porous medium (m$^2$); A is the cross-sectional area for flow; L is the length over which the pressure drop ($\Delta P = P_{out} - P_{in}$) occurs; and $P_{out}$ and $P_{in}$ stand for the pressures of outlet and inlet, respectively. In the instant example, the flow rate (Q) was fixed at 20 mL/min, and the same kind of porous electrode having the same permeability (k) and size (L and A) was used in each half-cell. Accordingly, the relationship between the pressure drop ($\Delta P$) and viscosity of fluid can be displayed as follows:

$$\mu\alpha \sim \Delta P \quad (2)$$

The average pressure in each half-cell can be calculated as follows:

$$P_{aver} = \frac{P_{in} + P_{out}}{2} = P_{out} - 0.5\Delta P \quad (3)$$

Figure 6A:
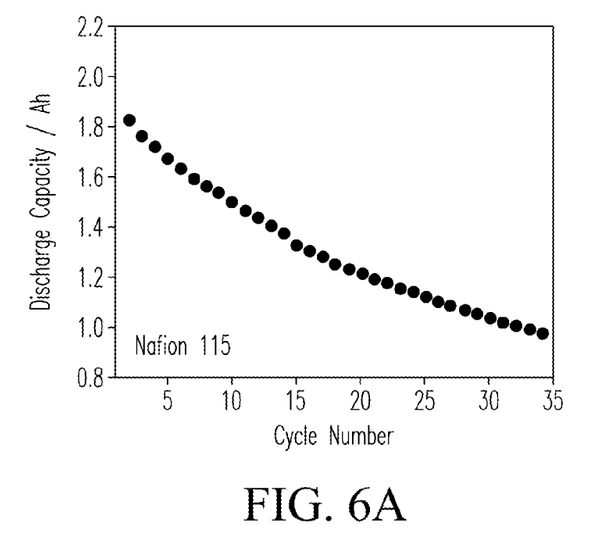
FIGS. 6A-6G include graphs summarizing pressure effects on the cycling performance of VRBs utilizing ion exchange membranes.
Figure 6B:
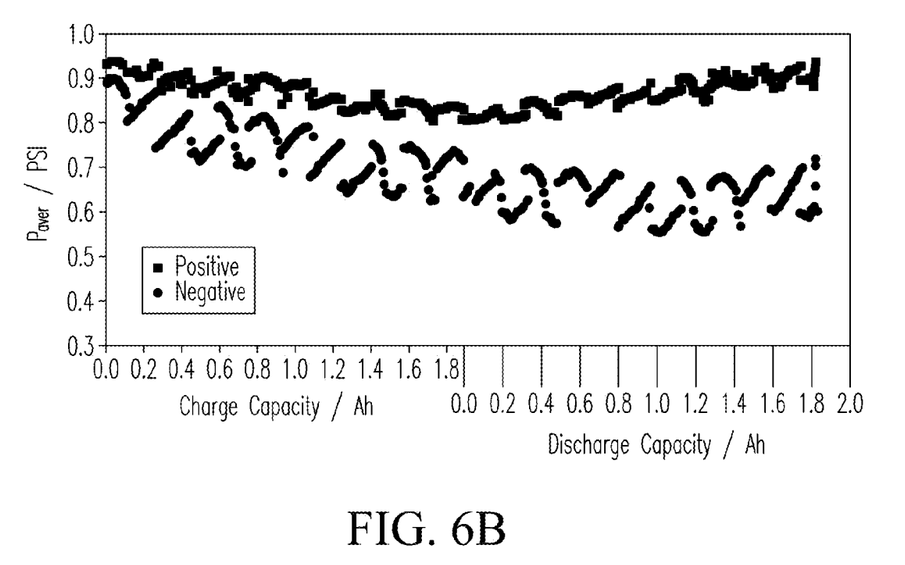
Figure 6C:
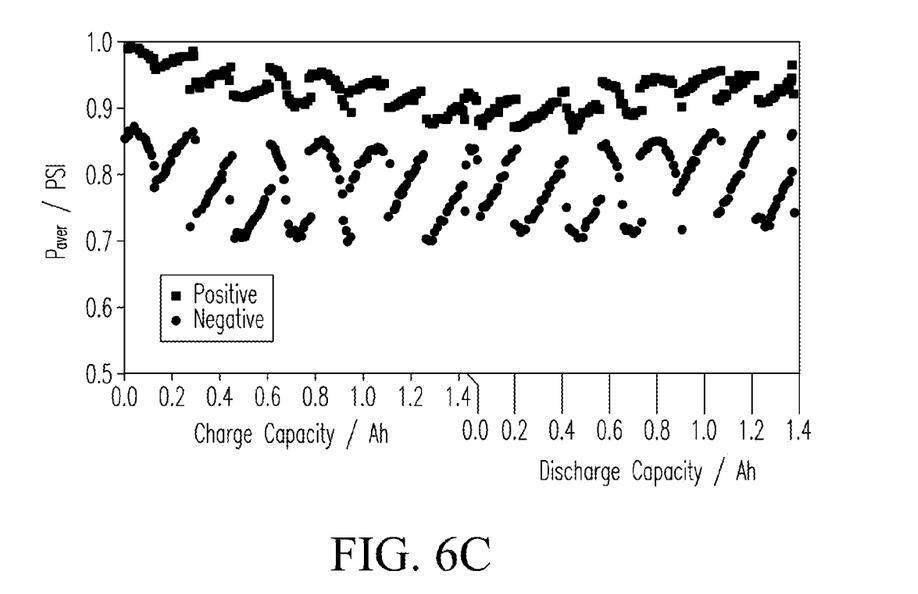
Figure 6D:
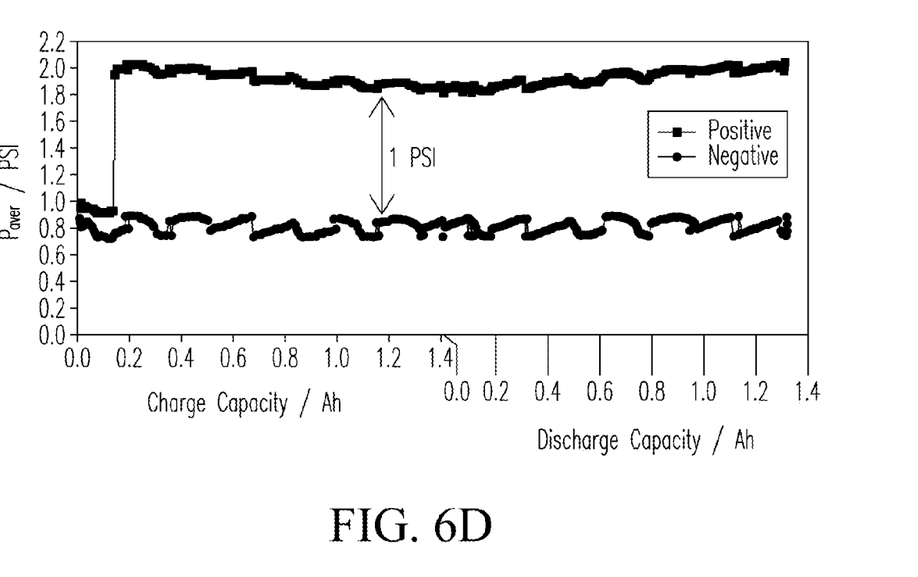
Figure 6E:
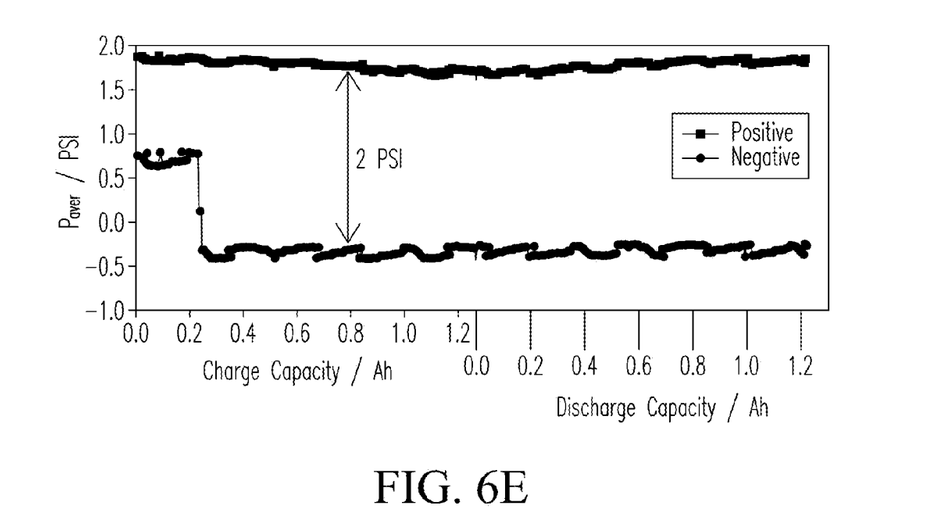
Figure 6F:
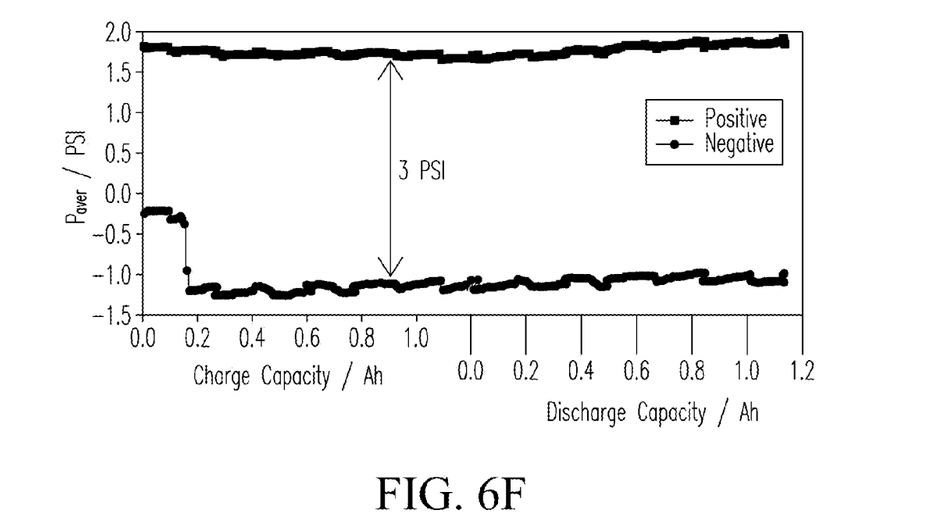
Figure 6G:
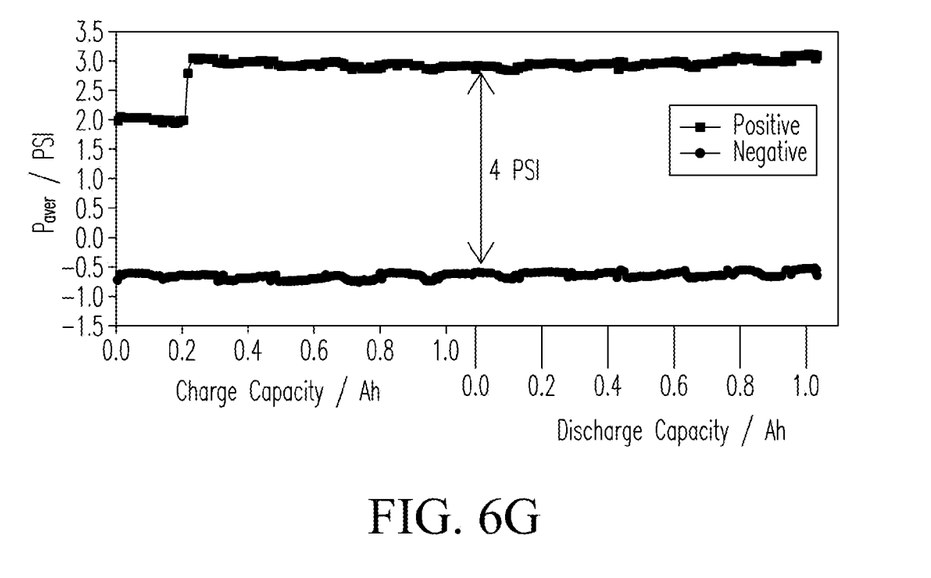

FIG. 6A shows the pressure effect on the capacity cycling performance for an RFB having a Nafion 115 membrane. Initially, the inside of both measuring cylinders was purged with $N_2$ so as to avoid the oxidation of vanadium ions. The gas pressures inside the positive and negative cylinders were different after the $2^{nd}$ cycle using N115 (see FIG. 6B). During cycling, even though $P_{aver}$ at the positive side was around 0.15 Psi higher than that at negative side for the first 14 cycles (FIG. 6C), a net transfer of solution from the negative side to the positive side occurred, accompanied by a significant capacity fading. In an attempt to drive solution from the negative side to the positive through a Nafion membrane, the pressure differentials at both sides of the membrane were gradually increased from 0.15 Psi up to 1 Psi (FIG. 6D), 2 Psi (FIG. 6E), 3 Psi (FIG. 6F), and 4 Psi (FIG. 6g) by regulating the gas pressures at both sides, using a configuration similar to the one shown in FIG. 5. However, when using a N115 membrane there was no influence on the direction of net transfer of solutions, and capacity loss was still observed.

Figure 7A:
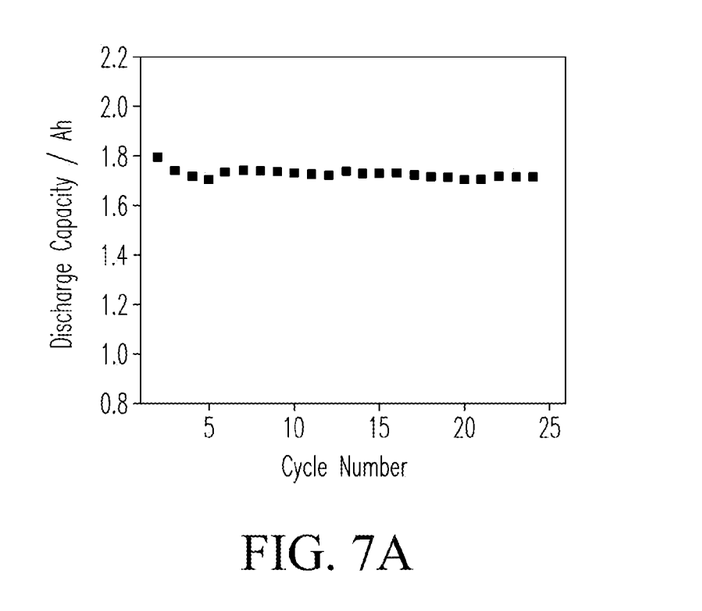
FIGS. 7A-7D include graphs summarizing pressure effects on the cycling performance of VRBs using porous separators as membranes.
Figure 7B:
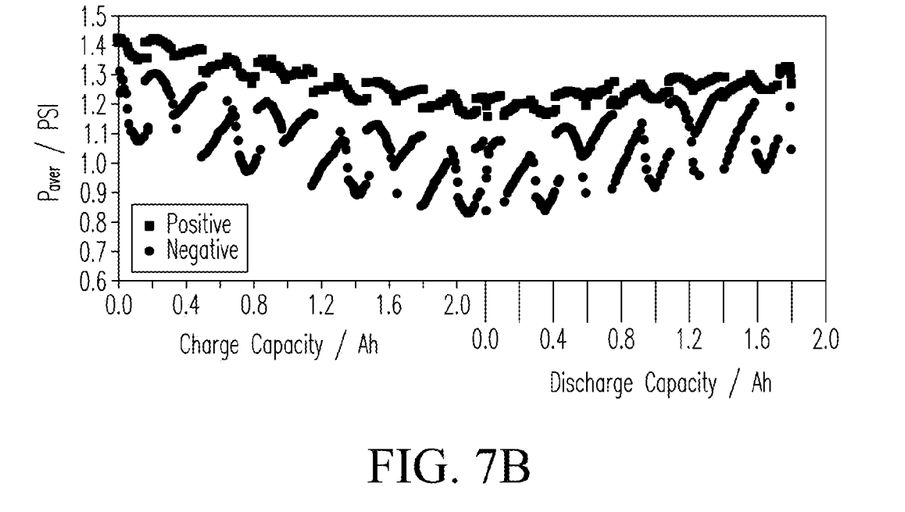
Figure 7C:
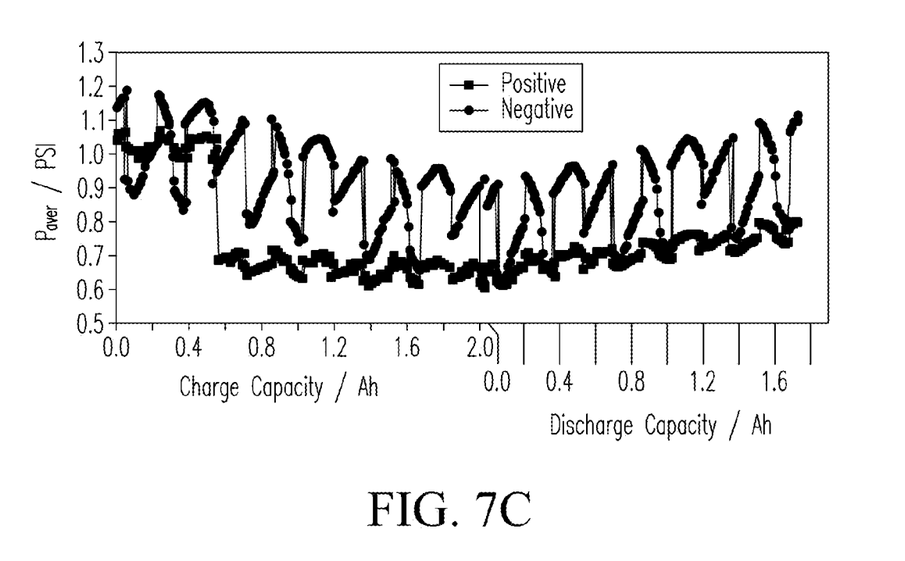
Figure 7D:
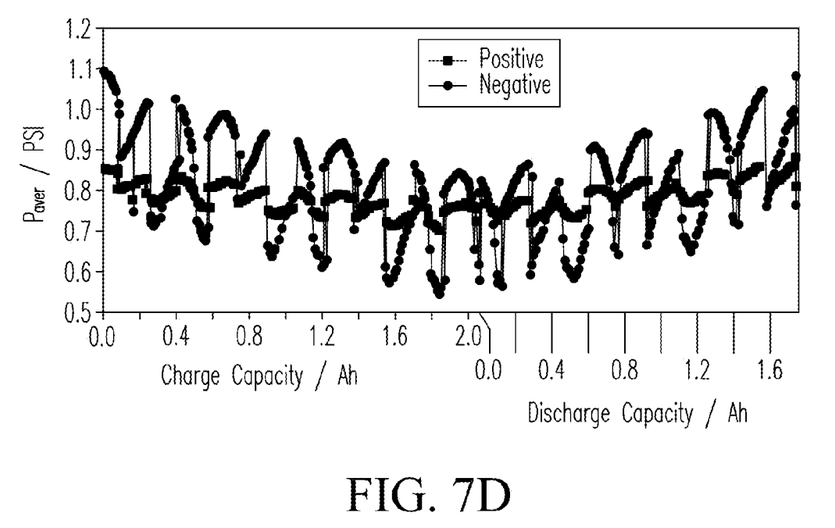

FIG. 7A-7D shows the pressure effect on the cycling capacity of a RFB having a micro-porous separator. FIG. 7A demonstrates the stable cycling of the vanadium flow battery with separator by adjusting the pressure on positive and negative side, respectively. For the second cycle (see FIG. 7B), the average pressure on the positive side was observed to be 0.2 PSI higher than that at negative side, consistent with the direction of the net transfer of solutions from positive side to another for the following 3 cycles. The discharge capacity was reduced by 4.8%, which was a smaller reduction than when using Nafion 115 as the membrane, suggesting the slower capacity decay with porous separators as membranes. In the same way, for the $6^{th}$ cycle (see FIG. 7C), $P_{out}$ at the positive side was decreased by 0.2 Psi by vacuum, resulting in higher $P_{aver}$ values at the negative side than at the positive side during the whole $6^{th}$ cycle. In contrast to the RFB having a Nafion membrane, the volume of solutions decreased at the negative side and increased at the positive side, leading to a recovery of discharge capacity as shown in FIG. 7A. Since the measuring cylinders were both sealed, the transfer of solutions would compress or expand the gases inside, bringing about the variety of $P_{out}$ values at both sides. From the $6^{th}$ cycle, the net solutions transferred from negative side to positive side resulted in decreasing $P_{out}$ (or $P_{aver}$) values at the negative side and increasing $P_{out}$ ($P_{aver}$) at the positive side. During the $8^{th}$ cycle, as is shown in FIG. 7D, the $P_{aver}$ values at both sides are nearly identical. During the following cycles, the volumes of solutions at both sides hardly varied and stable capacities were maintained.

Nafion, as one of cation-exchange membranes, was widely commercially applied in RFB systems. It can prevent the transfer of the active species while only allowing proton transport to complete the circuit between the positive and negative half-cells. However, in practice vanadium ions inevitably pass through the membrane and can play a significant role in causing the capacity fading during cycling.

Unexpectedly, when using a porous separator, as opposed to an ion exchange membrane, convection of active species appeared to affect the capacity fading behavior. In one instance, the pressure differential at both sides of Nafion membrane was increased to 4 Psi. The capacity decay still existed without any improvement, which suggested negligible convection of active species across the Nafion and which provided an explanation for earlier ignorance regarding the effects of convective flow. In addition, a net transfer of water from the negative to positive side was also observed. One would actually expect that osmosis would result in the net transfer of water from the positive side to the negative side. Instead, the net water transfer appears to be mainly determined by water being bound to vanadium ions and protons traveling across the nafion membrane. The applied large pressure drop over Nafion membrane barely changed the volumes of solutions, suggesting the convection has also no effects on the water transfer either.

Micro-porous polyethylene separators from Daramic, Inc.® were characterized with around 150 nm of pore diameter and 70% of porosity. The micro-porous structures enabled the capacity to be tailored by slightly regulating the pressure differential at both sides of the separator. The average pressure drop across separators corresponded to the direction of net transfer of solutions, suggesting the net transfer of water was primarily determined by convection. The nearly identical average pressure at both sides kept solution volumes and the capacities almost constant over cycling. Additionally, concentration gradient diffusion and electric-migration caused the amounts and concentrations of vanadium ions to simultaneously increase at positive side and decrease at negative side. For the RFB cells using porous separators, the concentrations of vanadium ions varied very little even if capacity fading occurred. This suggests that convection plays a significant role in capacity decay and that the effects of diffusion and electric migration can be neglected for flow cells using porous separators. Accordingly, in some embodiments, control of $P_{aver}$ values at one or both sides can minimize capacity decay. Besides the factor of $P_{out}$, based on the equation (1) and (3), $P_{aver}$ values can also be regulated by flowing rates (Q), which has also been confirmed by iron-vanadium system RFBs using porous separators.

Figure 8A:
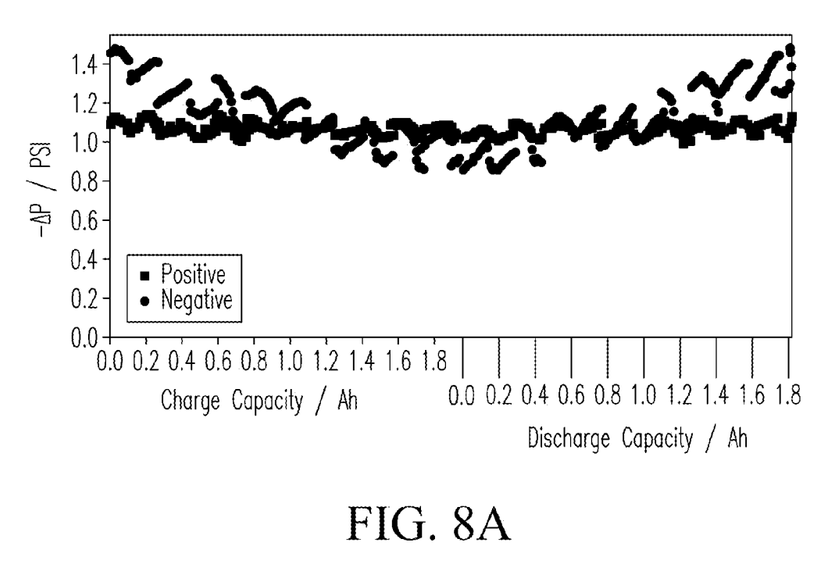
FIGS. 8A and 8B include graphs showing the pressure drop $(-\Delta P=P_{in}-P_{out})$ of each half-cell side for typical cycle vs. charge/discharge capacities utilizing Nafion (8A) and porous separator (8B) as membranes.
Figure 8B:
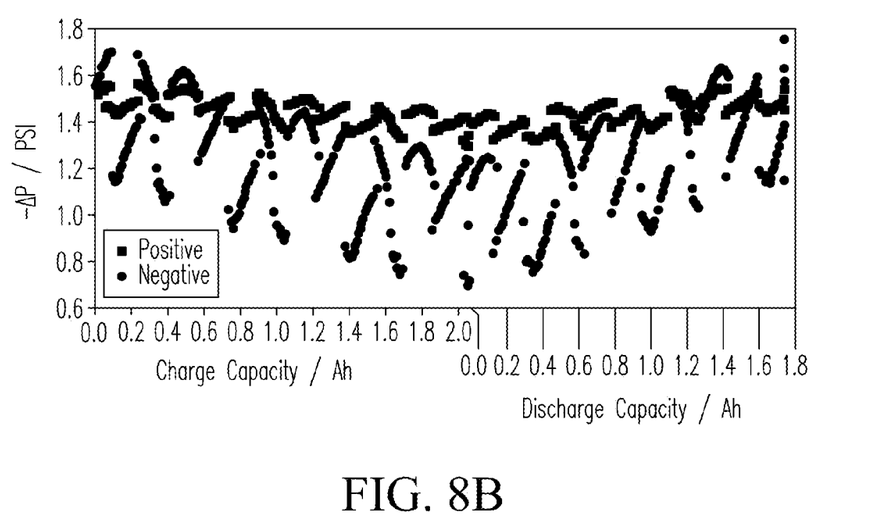

Referring to FIGS. 6A-6F and 7A-7D, $P_{aver}$ values at both sides of the separator decreased with increasing charge capacity and increased with increasing discharge capacity. Based on Equation (3), the trend of $P_{aver}$ values with capacity should agree well with that of $-\Delta P$. FIG. 8 shows the trend of $-\Delta P$ with charge/discharge capacities in a typical cycle using a Nafion or a porous separator. According to Equation (2), the trend of $-\Delta P$ can reflect that of solution viscosities. That is, viscosity of electrolytes at both sides could decrease with the increase of state of charge (SOC). For VRBs, the electrochemical reactions at both electrodes can be written as follows:

Positive: $VO^{2+} + H_2O - e \rightleftharpoons VO_2^+ + 2H^+ \quad E^0 = 1.00$ V vs. NHE  (4)

Negative: $V^{3+} + e \rightleftharpoons V^{2+} \quad E^0 = -0.25$ V vs. NHE  (5)

Based on the above chemical reaction, the chemical compositions at the positive and negative sides should be 2M $V^{4+}/5M\ H^+$ and 2M $V^{3+}/3M\ H^+$ with 0% of SOC, and 2M $V^{5+}/7M\ H^+$ and 2M $V^{2+}/5M\ H^+$ with 100% of SOC, respectively. On the one hand, the cations (vanadium ions) with higher valence states corresponded to higher solution viscosities due to the interaction with more anions (e.g. $O^{2-}$, $Cl^-$ and $SO_4^{2-}$). On the other hand, the increasing proton concentration will result in the reduction of viscosities. At the negative side, both the decreasing valence state of vanadium ions and increasing proton concentration led to the reduction of viscosities with charge capacity. But at the positive side, the increase of proton concentrations with SOC determined the trend of viscosities, although the increasing valence state of vanadium ions, leading to that the variety of viscosities at the positive with charge/discharge capacity was not obvious comparing with that at the negative side (see FIG. 8A). As is shown in FIG. 8B, for flow cells utilizing porous separators as membranes, supposing only internal condition (e.g. viscosity) are considered, the capacity loss must take place and the volumetric transfer of solutions will occur from the positive to the negative side. Therefore, the external conditions (e.g. $P_{out}$ and Q) have to be regulated at different electrode sides.

Figure 9:
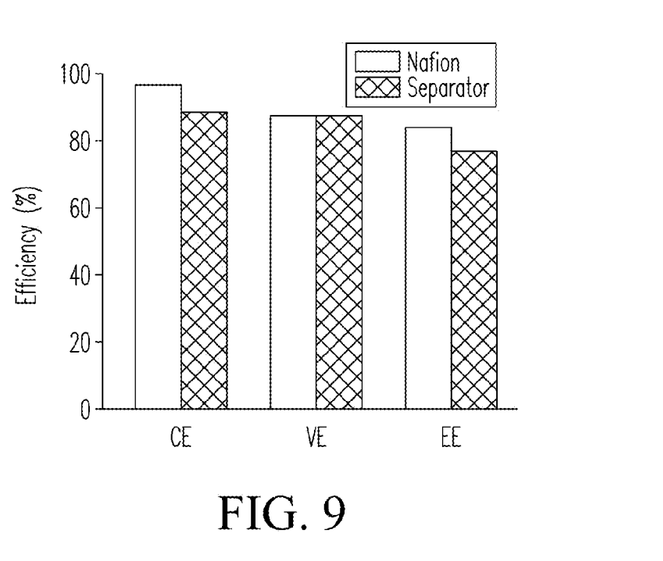
FIG. 9 is a graph showing efficiency values for VRBs using ion exchange membranes or porous separators as membranes.

Protons are considered the main transport species across Nafion membranes, but the inevitable net crossover of vanadium ions with bound water due to diffusion and migration will result in capacity loss. For cells using porous separators, the convective flow will cause vanadium ions to pass through the separator, leading to the reduction of columbic efficiency (CE) (see FIG. 9) compared to cells using Nafion as the membrane. Voltage efficiency (VE) for both kinds of separators show no obvious difference through different thicknesses of separators. Therefore, the energy efficiency (EE) was reduced by 8% with porous separators compared to Nafion membranes. CE values can be improved by slightly controlling the pore size and thickness of separators. However, embodiments described herein can compensate for the lower CE values associated with porous separators. In particular, capacity fading can be minimized by control of solution volumes on both sides of the separator. Furthermore, the concentrations of active species ions on either electrode side changes very little over cycling as a result of convection effect. This also reduces the potential formation of precipitates on the positive side resulting from the vanadium ion concentration in the positive electrolyte continually increasing in flow cells using ion exchange membranes.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. An all vanadium redox flow battery (RFB) having a composite separator between positive and negative electrolytes each comprising a vanadium redox couple, the RFB characterized by:
    the composite separator having a porous structure consisting essentially of pores having a median diameter between 5 nm and 250 nm;
    the composite separator comprising aggregated inorganic particles enmeshed in a matrix, the aggregated inorganic particles comprising an acid-stable, hydrophilic, inorganic material and the matrix comprising a substantially fully fluorinated polyolefin, wherein the substantially fully fluorinated polyolefin is from 30% to 95% of the polyolefin and inorganic material combined weight; and
    a pressure controller configured to regulate pressures applied to the positive and negative electrolytes on respective sides of the composite separator during battery operation, thereby adjusting the volume of the positive and negative electrolyte by flowing positive or negative electrolyte across the composite separator.

2. An all vanadium redox flow battery (RFB) having a composite separator between positive and negative electrolytes each comprising a vanadium redox couple, the RFB characterized in that the separator has a porous structure consisting essentially of pores having a median diameter less than or equal to 250 nm and the separator comprises aggregated inorganic particles enmeshed in a matrix, the aggregated inorganic particles comprising an acid-stable, hydrophilic, inorganic material and the matrix comprising a substantially fully fluorinated polyolefin, wherein the substantially fully fluorinated polyolefin is greater than 25% of the polyolefin and inorganic material combined weight.

3. The RFB of claim 2, wherein the substantially fully fluorinated polyolefin is from 30% to 95% of the polyolefin and inorganic material combined weight.

4. The RFB of claim 2, wherein the substantially fully fluorinated polyolefin is from 50% to 90% of the polyolefin and inorganic material combined weight.

5. The RFB of claim 2, wherein the substantially fully fluorinated polyolefin comprises a material selected from the group consisting of polytetrafluoroethylene (PTFE), hexafluoropropylene (HFP), fluorinated ethylene propylene (FEP), and combinations thereof.

6. The RFB of claim 2, wherein the acid-stable, hydrophilic, inorganic material comprises silicon oxide.

7. The RFB of claim 2, wherein the acid-stable, hydrophilic, inorganic material comprises a material selected from the group consisting of silicon, zirconium, niobium, titanium, boron, oxides thereof, nitrides thereof, and combinations thereof.

8. The RFB of claim 2, wherein the agglomerated inorganic particles have a median diameter less than or equal to 500 nm.

9. The RFB of claim 2, wherein the agglomerated inorganic particles comprise primary particles having an average diameter less than or equal to 100 nm.

10. The RFB of claim 2, wherein the porous structure comprises pores having a median diameter of at least 5 nm.

11. The RFB of claim 2, further comprising a pressure controller configured to regulate pressures applied to the positive and negative electrolytes on respective sides of the composite separator during battery operation, thereby adjusting the volume of the positive and negative electrolyte by flowing positive or negative electrolyte across the composite separator.

* * * * *